No. 628,832. Patented July 11, 1899.
T. R. MORGAN, Sr. & W. H. MORGAN.
OVERHEAD TRAVELING CRANE.
(Application filed Feb. 9, 1895.)
(No Model.) 10 Sheets—Sheet 1.

No. 628,832. Patented July 11, 1899.
T. R. MORGAN, Sr. & W. H. MORGAN.
OVERHEAD TRAVELING CRANE.
(Application filed Feb. 9, 1895.)
(No Model.) 10 Sheets—Sheet 2.

Witnesses
C. J. Nottingham
G. F. Downing

Inventors
T. R. Morgan Sr
and
W. H. Morgan
By H. A. Seymour
Attorney

No. 628,832. Patented July 11, 1899.
T. R. MORGAN, Sr. & W. H. MORGAN.
OVERHEAD TRAVELING CRANE.
(Application filed Feb. 9, 1895.)
(No Model.) 10 Sheets—Sheet 3.

No. 628,832. Patented July 11, 1899.
T. R. MORGAN, Sr. & W. H. MORGAN.
OVERHEAD TRAVELING CRANE.
(Application filed Feb. 9, 1895.)
(No Model.) 10 Sheets—Sheet 4.

No. 628,832. Patented July 11, 1899.
T. R. MORGAN, Sr. & W. H. MORGAN.
OVERHEAD TRAVELING CRANE.
(Application filed Feb. 9, 1895.)
(No Model.) 10 Sheets—Sheet 5.

No. 628,832. Patented July 11, 1899.
T. R. MORGAN, Sr. & W. H. MORGAN.
OVERHEAD TRAVELING CRANE.
(Application filed Feb. 9, 1895.)
(No Model.) 10 Sheets—Sheet 10.

Witnesses
E. J. Nottingham
G. F. Downing

Inventors
T. R. Morgan Sr
and
W. H. Morgan
By H. A. Seymour
Attorney

United States Patent Office.

THOMAS R. MORGAN, SR., AND WILLIAM HENRY MORGAN, OF ALLIANCE, OHIO.

OVERHEAD TRAVELING CRANE.

SPECIFICATION forming part of Letters Patent No. 628,832, dated July 11, 1899.

Application filed February 9, 1895. Serial No. 537,787. (No model.)

*To all whom it may concern:*

Be it known that we, THOMAS R. MORGAN, Sr., and WILLIAM HENRY MORGAN, of Alliance, in the county of Stark and State of Ohio, have invented certain new and useful Improvements in Overhead Traveling Cranes; and we do hereby declare the following to be a full, clear, and exact description of the invention, such as will enable others skilled in the art to which it appertains to make and use the same.

Our invention relates to an improvement in overhead traveling cranes, and is designed as an improvement on the crane shown and described in United States Patent No. 522,913, granted to John R. Morgan July 10, 1894.

The object of our invention is to provide means for counterbalancing the rack, thus relieving the lifting-motors of practically the weight of the rack.

A further object is to provide means whereby the operator is at all times in sight of the tongs or other grappling device, thus enabling him to more readily and quickly manipulate them.

A further object is to provide yielding appliances between the rack-bar and the rack-actuating motor.

With these objects in view our invention consists in the parts and combination of parts, as will be more fully described, and pointed out in the claims.

Figure 1:
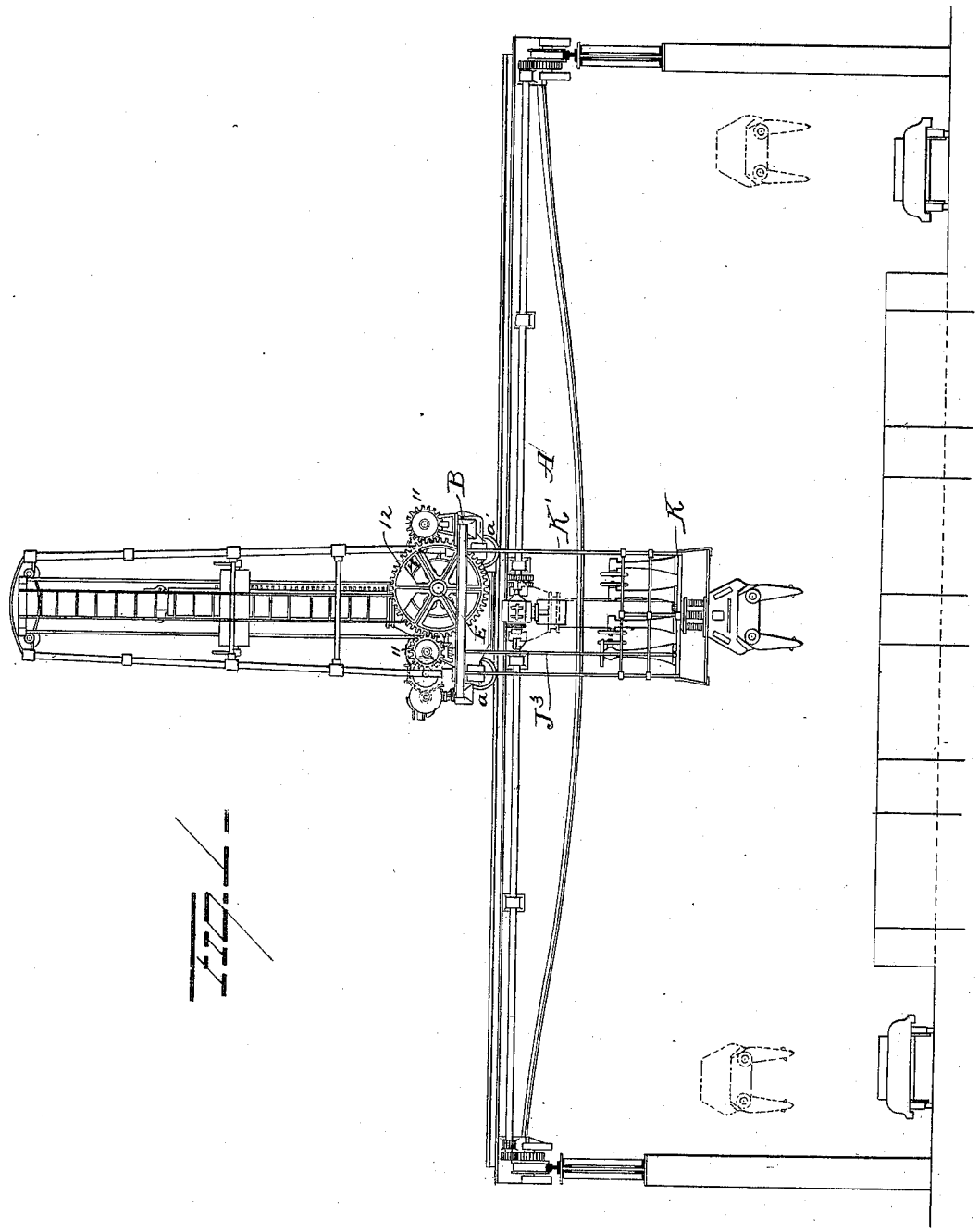
Figure 2:
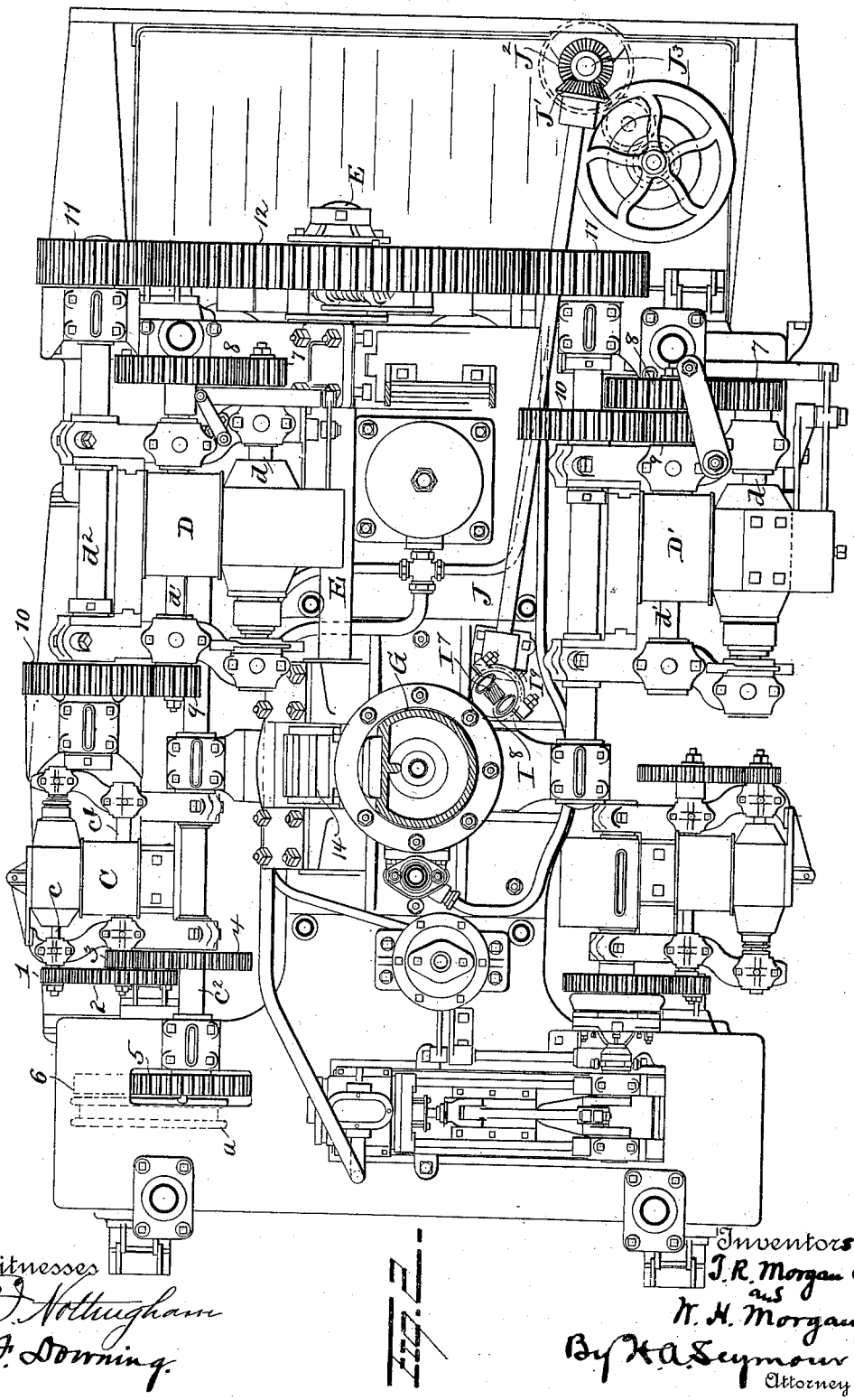
Figure 3:
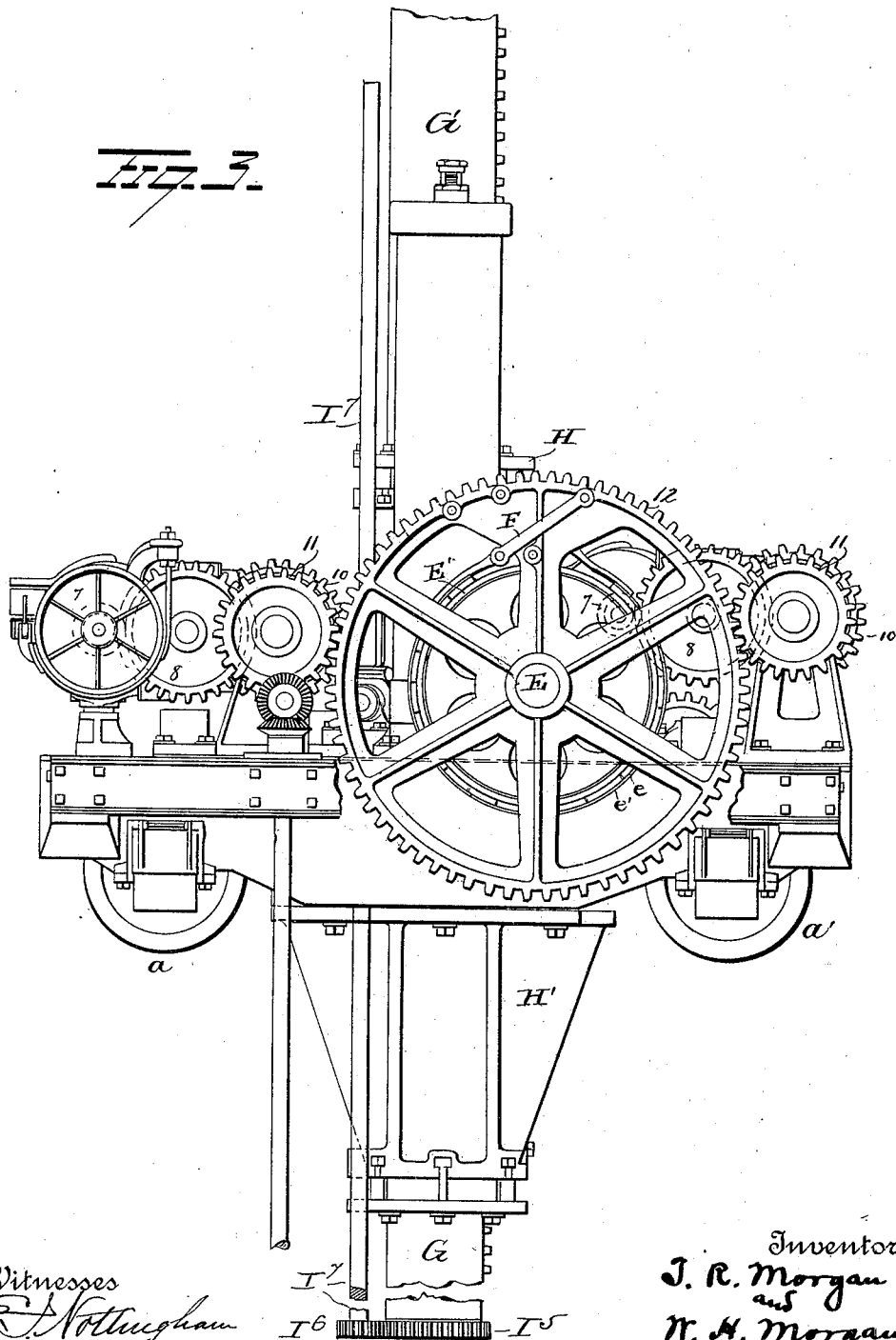
Figure 4:
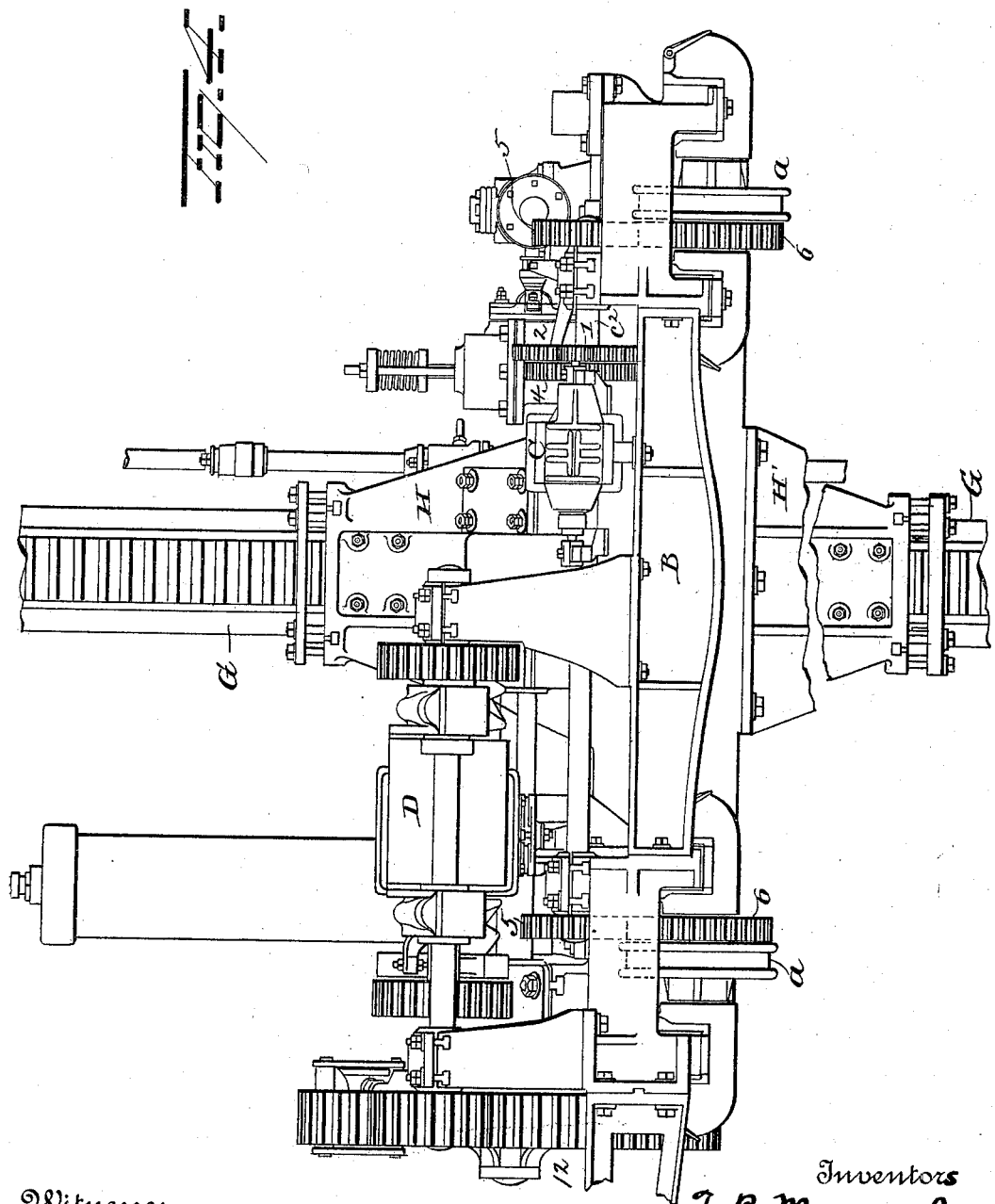
Figure 5:
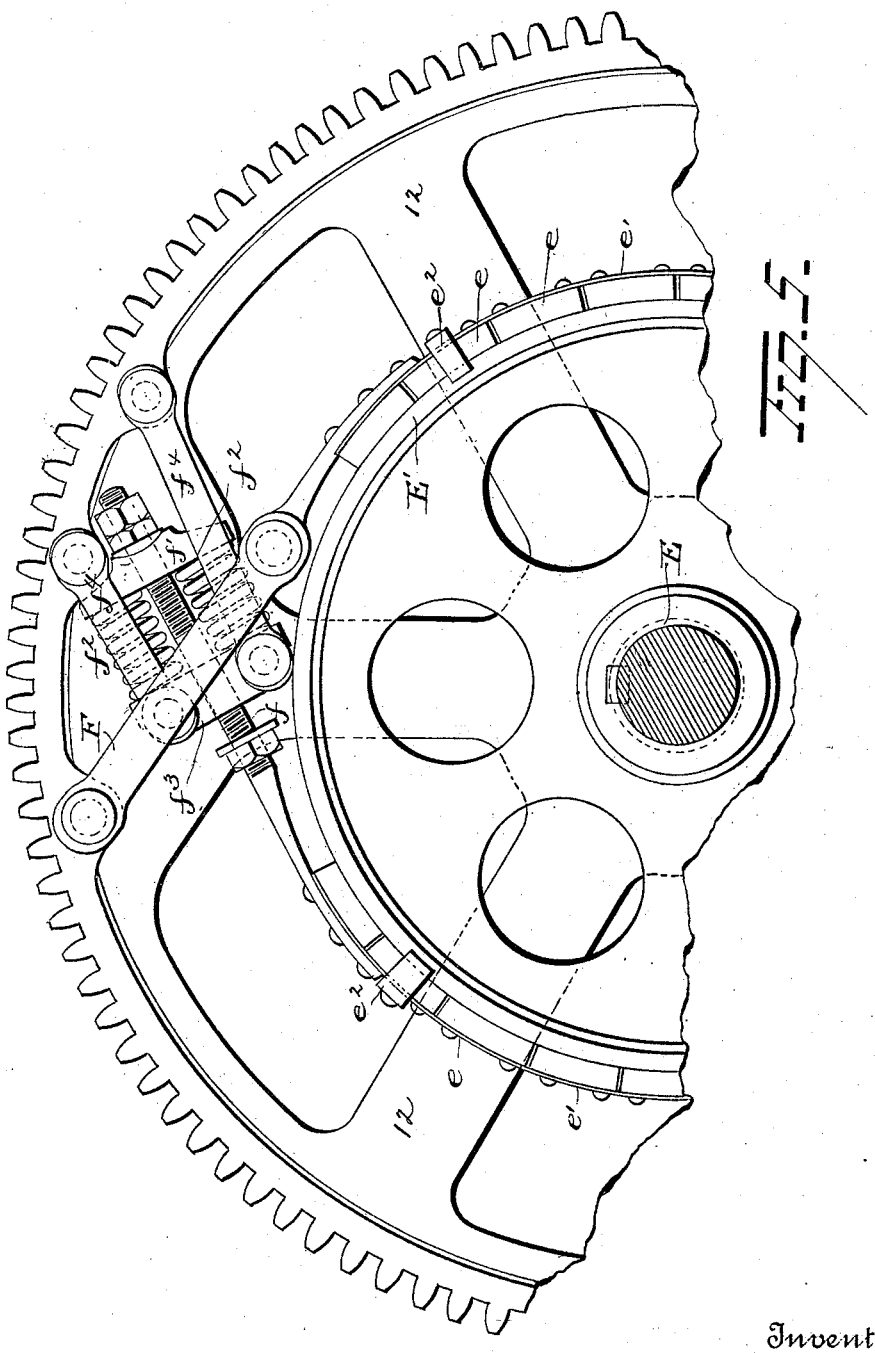
Figure 6:
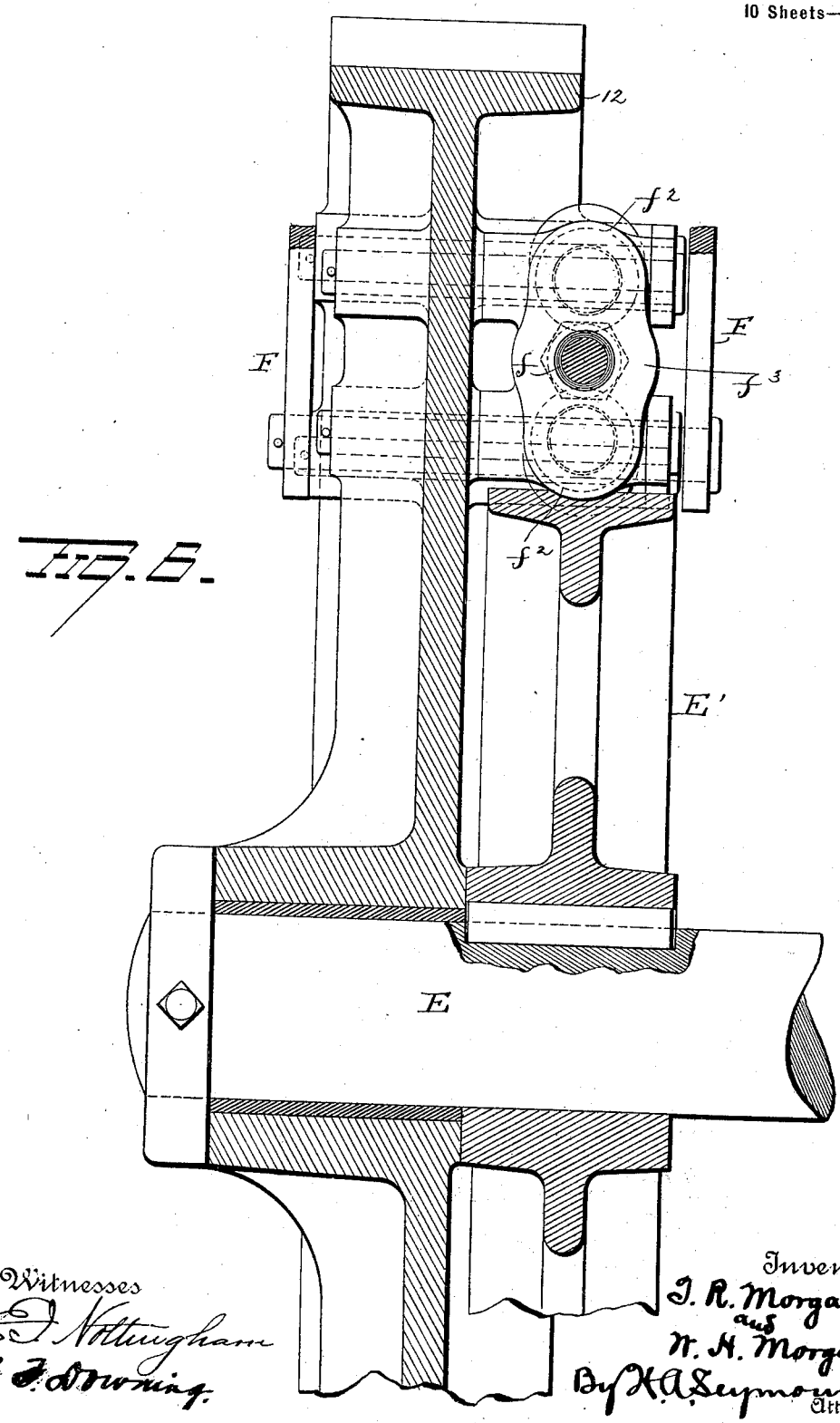
Figure 7:
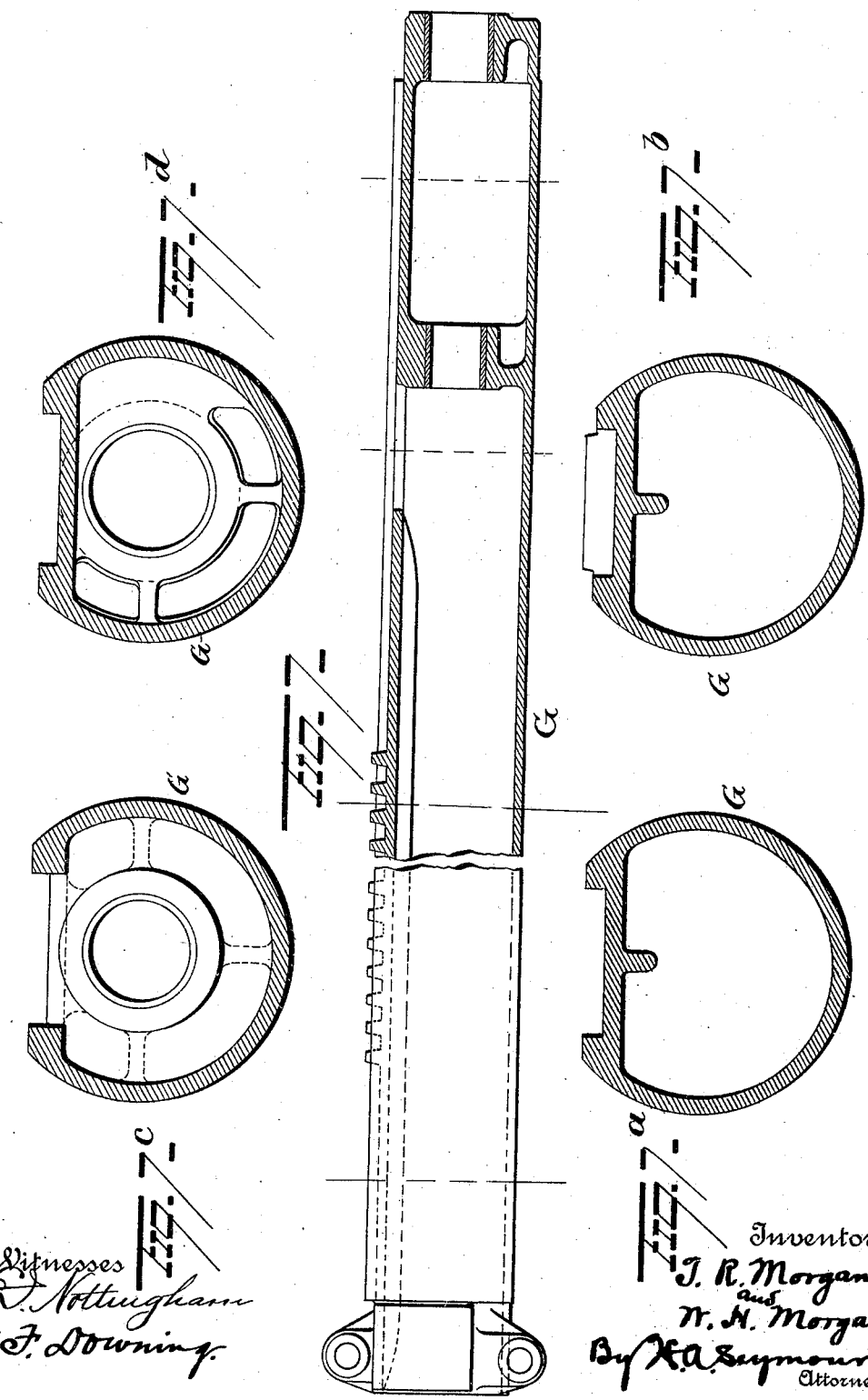
Figure 8:
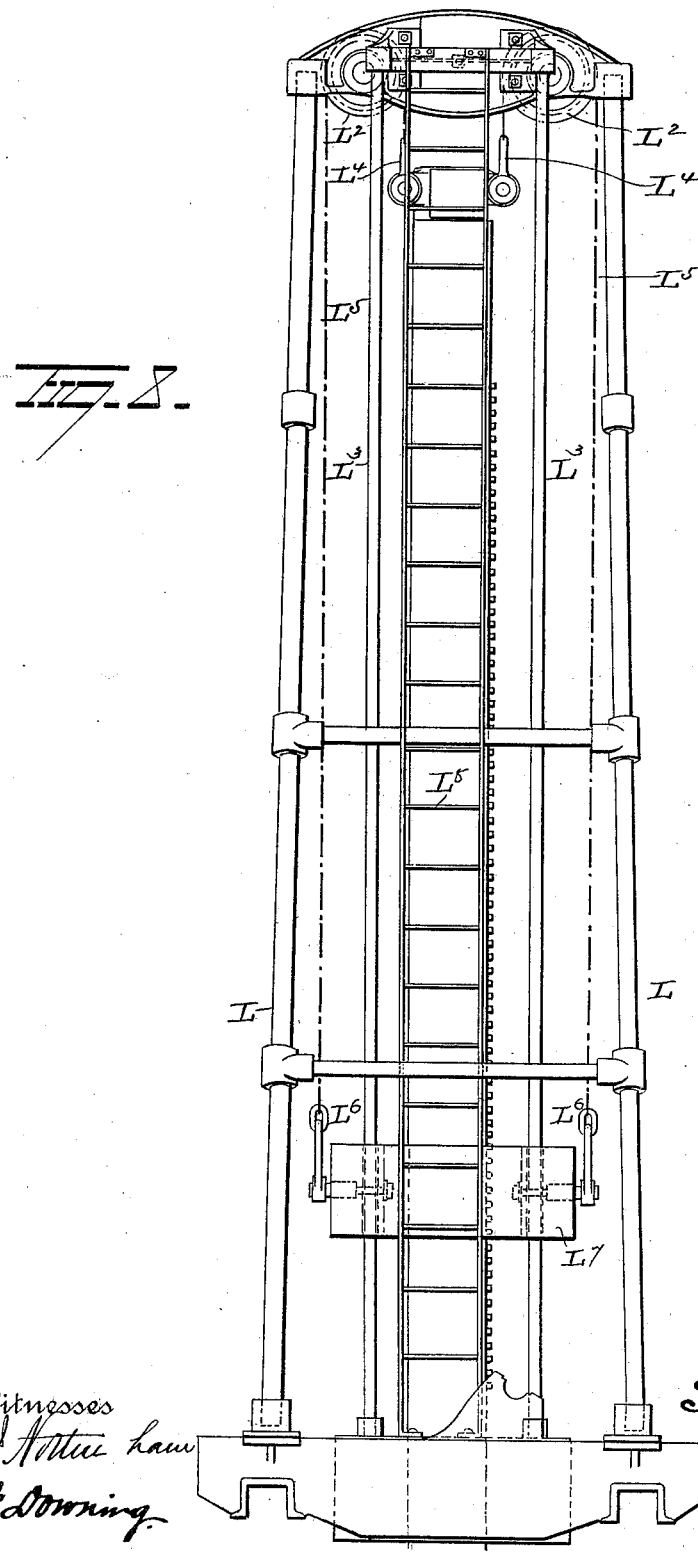
Figure 9:
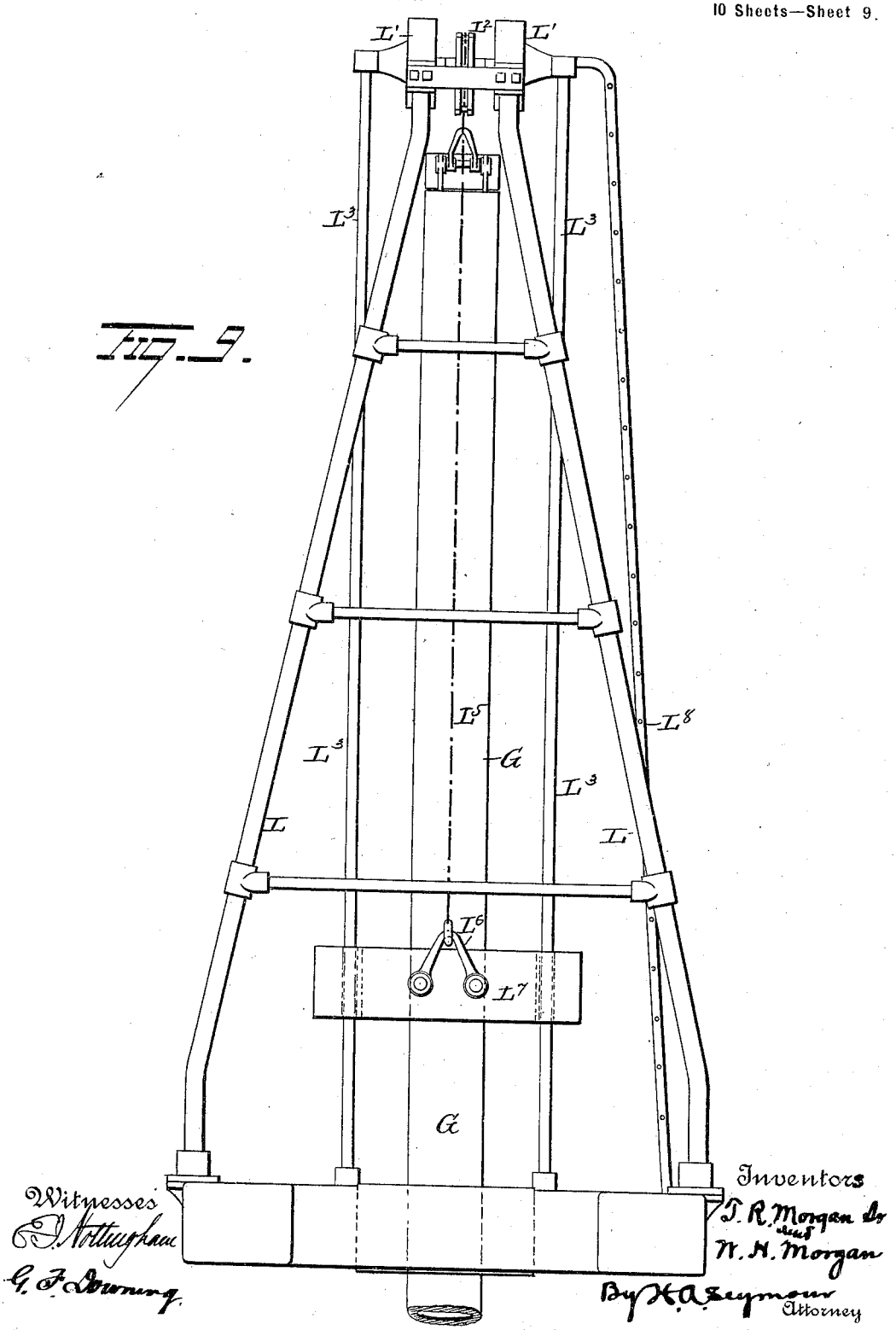
Figure 10:
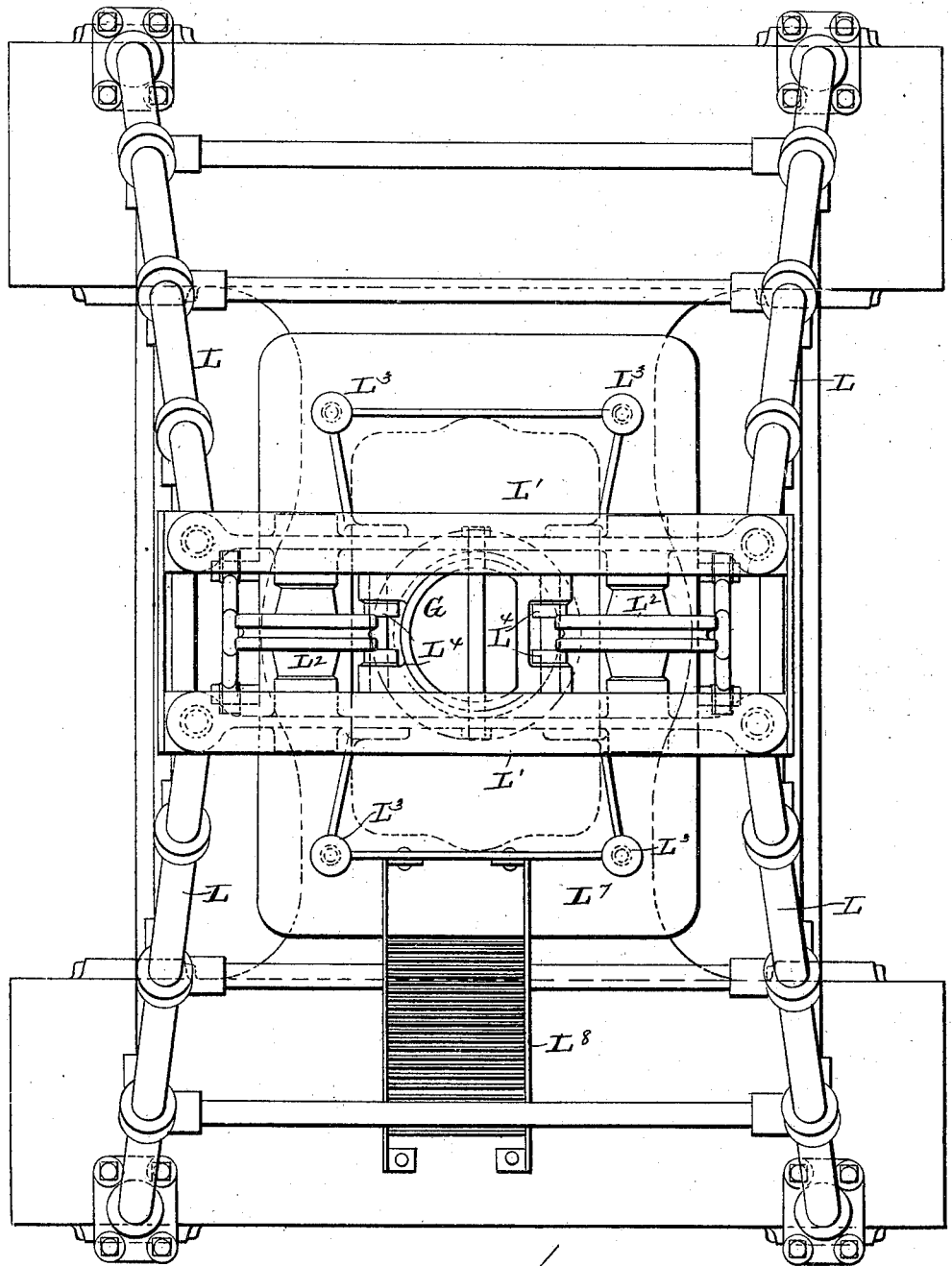

In the accompanying drawings, Figure 1 is a view in side elevation of a crane embodying our invention. Fig. 2 is a plan view of the trolley, the tower being broken away and the rack-bar shown in section. Fig. 3 is a view in side elevation, and Fig. 4 a view in end elevation, of the trolley. Fig. 5 is a view in elevation of the friction-wheel, and Fig. 6 is a view in section of the same. Figs. 7, $7^a$, $7^b$, $7^c$, and $7^d$ are views of the rack-bar; and Figs. 8, 9, and 10 are, respectively, views in end and side elevation and plan of the counterbalancing mechanism.

A represents the bridge of an overhead traveling crane, mounted at its ends on wheels adapted to traverse an elevated track in the usual manner, and B is a trolley adapted to traverse lengthwise the bridge. The details of the construction of this trolley are not material to the invention covered by the claims. Hence only such parts thereof and attachments thereto as are essential will be referred to.

The trolley B is mounted on four wheels $a$ $a'$, the wheels $a$ at one end being the driving-wheels. The driving-wheels $a$ are driven by the motor C, mounted on the trolley, through the following gearing: Secured to the armature-shaft $c$ of the motor C is the pinion 1, which meshes with pinion 2, fast on shaft $c'$. Rigidly secured on shaft $c'$ or to pinion 2 is the smaller pinion 3, which meshes with pinion 4, fast on driving-shaft $c^2$. Shaft $c^2$ extends crosswise the trolley and is provided near its ends with pinion 5, which latter meshes with pinions 6, fast to the axles of wheels $a$ or to the wheels themselves.

The motor C, together with the other motors to be hereinafter referred to, is supplied with current through wires, ribbons, or other conductors leading from a suitable generator.

The motors D D' actuate the rack-bar and are preferably coupled up electrically as well as mechanically, so that they simultaneously exert their power to elevate or lower the rack-bar, as the case may be. Each motor is provided with an armature-shaft $d$, carrying a pinion 7, which meshes with a pinion 8 on shaft $d'$. Each shaft $d'$ also carries a smaller pinion 9, which meshes with larger pinion 10 on shaft $d^2$. Each shaft $d^2$ is provided at its outer end with a pinion 11, both of which latter engage the large toothed wheel 12, loosely mounted on the drive-shaft E.

Keyed or otherwise rigidly secured to shaft E is the brake-wheel E', smaller in diameter than toothed wheel 12 and located in close proximity thereto. This brake-wheel is provided with a smooth periphery for the blocks $e$, which latter are carried by the flexible strap $e'$. The strap $e'$ is provided at intervals with clips $e^2$, which overhang the edges of the brake-wheel and prevent displacement of the brake-band and its attached blocks.

One end of the brake-band $e'$ is attached by a link or links F to the wheel 12, near the periphery of the latter, as shown in Fig. 5, while the opposite end is provided with a screw $f$, which crosses link F and passes through block $f'$ and is provided on its outer end with a nut which bears against said block. This block rests on the springs $f^2$, which in turn are supported by the block $f^3$, carried by the links $f^4$. The links $f^4$ are pivoted at their inner ends to block $f^3$ and at their outer ends to wheel 12, near the periphery of the latter. From the foregoing it will be seen that the band $e'$ encircles the brake-wheel E' and is yieldingly connected to the wheel 12 through the intervention of the springs.

The rack-bar G is mounted in bearings to be hereinafter described and is actuated or moved vertically by the pinion 14 on shaft E.

When the motors D and D' are energized and in motion, the wheel 12 is turned by the gearing before described. This wheel transmits motion to shaft E through the intervention of the brake-wheel and brake-band. In lifting or lowering the rack-bar power is transmitted to the brake-wheel through the link F and brake-band $e'$. Hence the instant wheel 12 is turned the brake-blocks tightly grip the brake-wheel and communicate the motion to the brake-wheel and to the shaft E and pinion 14, thus elevating or lowering the rack-bar. The rack-bar carries tongs or grappling-hooks at its lower end for depositing ingots in and removing them from soaking-pits located below the floor of the mill, and the yielding connection or friction-brake between the wheel 12 and shaft E is designed to permit the gearing which actuates the bar to slip in the event the motors are not stopped at the instant the tongs come in contact with the floor or other obstacle which would prevent its further descent. While this yielding connection might be dispensed with, I prefer to use it, as it overcomes all tendency to lift the trolley off the track, as would occur if through neglect or inattention on the part of the operator the motors were not stopped at the proper moment.

The rack-bar is curved transversely in the arc of a circle, as shown, the flat portion thereof being provided with the teeth which are engaged by the pinion 14. This bar passes vertically approximately through the center of the trolley and is supported rigidly in its vertical position by the upper and lower bearings H H', the former of which projects upwardly from the trolley, while the latter depends from the lower side of the trolley, thus affording ample support for the rack at points above and below the point of engagement of the pinion 14 therewith. The rack carries tongs or any approved form of grapple, and the latter are mounted in the lower end of the rack, the connection being such that the tongs or other grapple can be rotated. The spindle or shaft carrying the tongs or other grapple is provided at a point adjacent to the lower end of the rack-bar with a pinion $I^5$, which latter meshes with the pinion $I^6$ on the shaft $I^7$. This shaft $I^7$ is preferably angular in cross-section and is journaled in bearings carried by the rack-bar, so as to move vertically with the rack-bar. This shaft $I^7$ moves through an angular opening in the bevel-pinion $I^8$, adjacent to the top of the trolley, and the bevel-pinion $I^8$ meshes with the pinion $I^9$ on shaft J, journaled in bearings to the top of the trolley. This shaft passes transversely over the trolley and is provided at its overhanging end with a pinion J', which latter meshes with pinion $J^2$, fast on the vertical shaft $J^3$. Shaft $J^3$ extends downwardly toward the operator's cage K and is provided at a point convenient to the operator with a hand-wheel, lever, or other device by which it can be turned. By turning the shaft the spindle or shaft carrying the tongs or other grapple is turned as necessity demands.

The operator's cage K is suspended from the trolley at the side thereof by means of the rods or other supports K' and is located well down below the bridge, so as to give the operator an unobstructed view of the shop or foundry and also places him in a position where he can have the tongs or grapple in view at all times, thus enabling him to manipulate the several parts without assistance. Within this cage are located the devices for regulating the movements of the several motors which actuate the bridge, trolley, and rack-bar and also the mechanism which actuate the tongs or other grappling device. The tongs may be actuated—i. e., opened to release an ingot or other object and closed to grasp an ingot—by means of pneumatic or hydraulic device or by electrical or mechanical devices of any improved form.

Another and important feature of our invention consists in counterbalancing the rack-bar, so that the motors are relieved, practically, of the weight of the rack.

The devices for counterbalancing the rack consist, essentially, of a tower composed of four uprights L, mounted at their lower ends in seats formed in the upper face of the trolley. These uprights converge, as shown, are braced at intervals throughout their length, and carry at their upper ends the blocks L', which latter are provided with bearings for the pulleys $L^2$. The blocks L' also carry bearings or supports for the four vertical parallel guide-rods $L^3$, the lower ends of which rest in seats on the upper face of the trolley.

Secured to the upper end of the rack-bar by any suitable means are the links $L^4$, to each of which is secured a chain or cable $L^5$. Each chain or cable passes up and over its respective pulley and then down and is attached at its lower end to the eyes $L^6$, secured to the weight $L^7$. This weight $L^7$ practically counterbalances the weight of the rack-bar and is provided with four openings for the guide-rods $L^3$, by which the weight is guided and by which it is prevented from swaying. The chains pass down on opposite sides of the rack-bar and are attached to the weight at diametrically opposite points, the weight being provided with a central opening for the free passage of the rack-bar.

From the foregoing it will be seen that as the rack-bar moves either downwardly or upwardly while either loaded or free the weight is moved up or down, thus operating to practically counterbalance the bar at all times and utilizing approximately the entire power of the motor for actuating the load carried by the tongs or other grapple.

To enable the parts at the top of the tower to be readily inspected, oiled, &c., we have provided the ladder $L^8$, which ladder extends from the trolley to the top of the tower.

It is evident that numerous changes in the construction and relative arrangement of the various parts might be resorted to without departing from the spirit of our invention. Hence we would have it understood that we do not confine ourselves to the details shown and described, but consider ourselves at liberty to make such changes and alterations as fairly fall within the spirit and scope of our invention.

Having fully described our invention, what we claim as new, and desire to secure by Letters Patent, is—

1. The combination with a traveling trolley, a rack-bar carried thereby and a motor and gearing for actuating the rack-bar, of guide-rods, a counterweight mounted on the rods and means connecting the counterweight with the rack-bar for counterbalancing the latter.

2. The combination with a traveling trolley, a rack-bar carried by said trolley and motor and gearing for actuating the rack-bar, of a tower secured to the trolley, guide-rods supported at their upper ends by the tower, pulleys carried by the tower, a counterweight mounted on the rods and chains or cables connecting the rack-bar and counterweight and passing over the pulleys.

3. The combination with a traveling trolley, a rack-bar, and a motor and gearing for actuating the rack-bar, of guide-rods, a counterweight mounted on the rods, a tower supporting the upper ends of the rods, pulleys mounted in bearings at the upper end of the tower and two chains or cables each connected at one end to the rack-bar and at its other end to the weight, the said chains or cables passing over the pulleys.

4. In a crane, the combination with a traveling trolley and a rack-bar carried by said trolley, of a shaft for actuating said rack-bar, and a motor and gearing for actuating said shaft, a slip device constituting a part of said gearing, substantially as and for the purpose set forth.

5. In a crane the combination with a traveling trolley and a rack-bar carried by said trolley, of a shaft for actuating the rack-bar and two motors and gearing for imparting motion to the shaft, a yielding device constituting part of said gearing substantially as and for the purpose described.

6. In a crane, the combination with a traveling trolley, a rack-bar carried by same and a shaft for actuating the rack-bar, of a motor and gearing, the latter including a loose pinion, a brake-wheel fast on the shaft and adjacent to said pinion, and a brake-band yieldingly connected to the pinion and embracing the brake-wheel, substantially as set forth.

7. In a crane, the combination with a trolley and a rack-bar, of a shaft for actuating the rack-bar, a loose pinion, a brake-wheel fast to said shaft, a brake-band encircling the wheel and attached at its ends to the loose pinion, and a motor and gearing for imparting motion to the pinion, substantially as set forth.

8. In a crane, the combination with a trolley and a rack-bar, of a shaft for actuating the rack-bar, a loose pinion, a brake-wheel fast on said shaft adjacent to the loose pinion, a brake-band encircling the brake-wheel, the ends of said bands crossing each other and secured to the pinion, and a motor and gearing for actuating the loose pinion.

9. In a crane, the combination with a trolley and a rack-bar, of a shaft for actuating the rack-bar, a brake-wheel on said shaft, a loose pinion adjacent to the brake-wheel, a brake-band encircling the brake-wheel, one end of said band being yieldingly connected to the loose pinion and the other end unyieldingly connected thereto, and a motor and gearing for transmitting motion to the loose pinion.

10. In a crane, the combination with a trolley and a rack-bar, of a shaft for actuating the rack-bar, a brake-wheel fast on said shaft a loose pinion adjacent to the brake-wheel, and a brake-band encircling the brake-wheel, the ends of said band crossing each other, one end being yieldingly connected to the loose pinion and the other unyieldingly connected thereto, substantially as set forth.

11. The combination with a traveling trolley, a rack-bar carried thereby and gearing on the trolley for actuating the rack-bar, of a weight having a central opening for the passage of the rack-bar, sheaves and chains or cables passing over said sheaves, each chain connected at one end to the weight and at its other end to the rack-bar.

In testimony whereof we have signed this specification in the presence of two subscribing witnesses.

THOMAS R. MORGAN, Sr.
WILLIAM HENRY MORGAN.

Witnesses:
E. WOOLGAR,
W. O. BROSIUS.